April 9, 1957 D. E. SCHLEGELMILCH 2,787,857
ADJUSTABLE REEL CLAMP FOR FISHING RODS
Filed Oct. 2, 1953
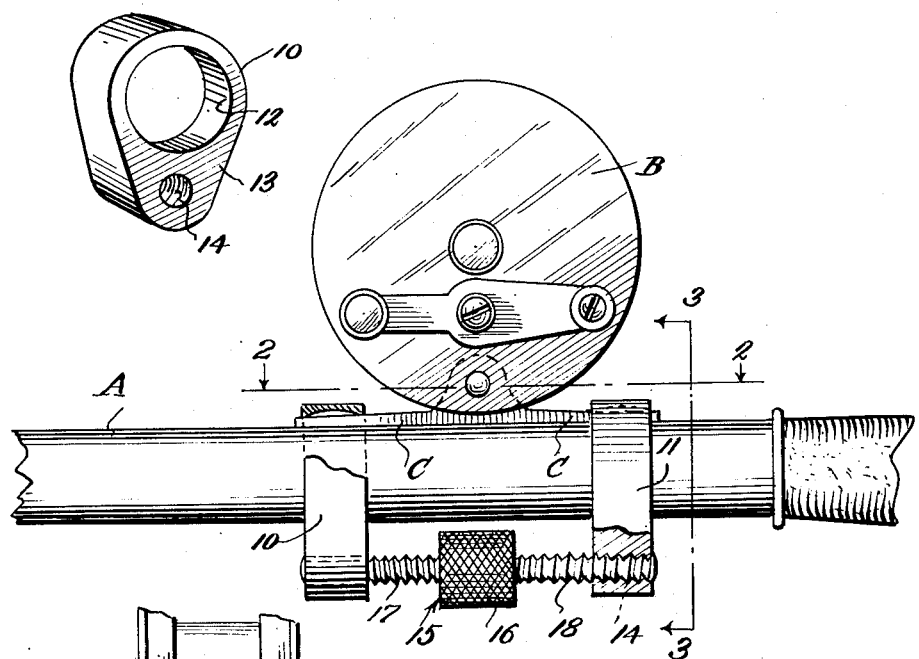
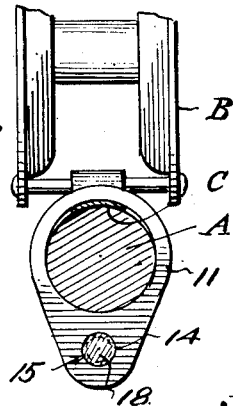
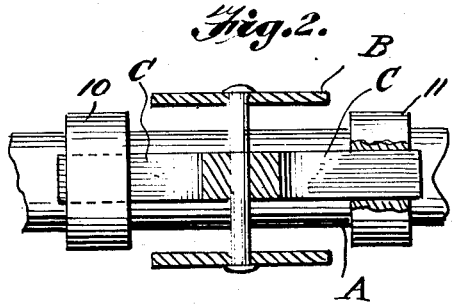
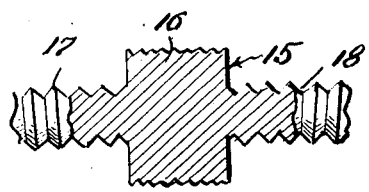
INVENTOR.
DONALD E. SCHLEGELMILCH
BY
Patrick O Beavers
ATTORNEY

United States Patent Office 2,787,857
Patented Apr. 9, 1957

2,787,857
ADJUSTABLE REEL CLAMP FOR FISHING RODS

Donald E. Schlegelmilch, Flint, Mich.

Application October 2, 1953, Serial No. 383,853

1 Claim. (Cl. 43—22)

This invention relates to improvements in clamp means for fishing reels and more particular to an adjustable clamp for the new type spinning reels.

The principal object of the present invention is to provide a clamp which can be adjusted at any position on a fishing rod handle to meet the demands of the fisherman.

Another object of the invention is to provide a very simplified clamp that will be positive acting and durable.

Another object of the invention is to provide a fishing reel clamp that is of very simple construction and capable of being manufactured and retailed at a low monetary figure.

These and other objects and advantages of the invention will become apparent to the reader of the following description.

In the drawing:

Figure 1 is a fragmentary side elevational view showing a fishing reel held in place on a fishing rod handle, by the improved clamp, a portion of the clamp being shown broken away.

Figure 2 is a section taken substantially on line 2—2 of Figure 1.

Figure 3 is a section taken substantially on line 3—3 of Figure 1.

Figure 4 is a fragmentary side elevational and sectional view of the screw shaft.

Figure 5 is a perspective view of one of the followers.

Referring to the drawing wherein like numerals designate like parts, it can be seen, that reference character A denotes a fishing rod handle section, while reference character B denotes a fishing reel, the base portion of which is provided with a pair of tapered and oppositely directed legs C, which are curved to fit the rod section A.

In carrying out the present invention a pair of collar-like followers 10, 11 are employed, each having an opening 12 to receive the fishing rod section A and with a depending portion 13 formed with a threaded bore 14. The bore of one depending portion 13 is oppositely threaded from the threads of the other follower, namely follower 11, if follower 10 is first considered.

A threaded shaft generally referred to by numeral 15 consists of a central cylindrical body 16, preferable knurled and projecting from this body 16 and opposite direction are reversely threaded shaft sections 17, 18 for threaded disposition in the bores 14 of the collars 10, 11.

The opening 12 of the followers 10, 11 are oversized so as to fit over the legs C, C of the reel B and as these legs are tapered, the followers 10, 11 will gradually wedge against the legs and clamp the legs firmly against the handle section A, when the screw shaft 15 is rotated to draw the followers 10, 11 toward each other.

In other words, the operation of the mechanism above described consists in placing the parts substantially as shown in Figure 1, rotating the knurled body 16 in a direction to contact the followers 10, 11, with the result that these followers bind against the legs C, C and clamp these legs firmly against the rod section A, thus firmly holding the fishing reel against the rod section.

It is a simple matter to unloosen the screw shaft 15, somewhat fraying the followers 10, 11, so that the reel and this clamp structure can be shifted along the rod section to another desired position.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

For use with a fishing rod and a reel having a base including a pair of oppositely extending tapered legs, a clamp comprising a pair of followers each having an aperture adapted to receive said rod and one of said legs and a threaded opening, said openings being oppositely threaded, a shaft having oppositely threaded end portions engaged in said threaded openings, and a handle forming the central portion of said shaft.

References Cited in the file of this patent

UNITED STATES PATENTS

| 330,985 | Kopf | Nov. 24, 1885 |
| 878,757 | Wheeler | Feb. 11, 1908 |
| 1,065,408 | Thorsby | June 24, 1913 |
| 2,222,752 | Guarnieri | Nov. 26, 1940 |

FOREIGN PATENTS

| 1,234 | Great Britain | 1884 |